United States Patent
Ling et al.

(10) Patent No.: US 7,089,363 B2
(45) Date of Patent: Aug. 8, 2006

(54) SYSTEM AND METHOD FOR INLINE INVALIDATION OF CACHED DATA

(75) Inventors: Shu Ling, San Mateo, CA (US); Xiang Liu, San Mateo, CA (US); Fredric Goell, Foster City, CA (US); Lawrence Jacobs, Redwood City, CA (US); Tie Zhong, San Jose, CA (US); Xiaoli Qi, San Mateo, CA (US)

(73) Assignee: Oracle International Corp, Redwood Shores, CA (US)

( * ) Notice: Subject to any disclaimer, the term of this patent is extended or adjusted under 35 U.S.C. 154(b) by 285 days.

(21) Appl. No.: 10/727,309

(22) Filed: Dec. 2, 2003

(65) Prior Publication Data

US 2005/0055509 A1   Mar. 10, 2005

Related U.S. Application Data

(60) Provisional application No. 60/500,726, filed on Sep. 5, 2003.

(51) Int. Cl.
*G06F 12/00* (2006.01)

(52) U.S. Cl. .................................................. 711/133

(58) Field of Classification Search ..................... None
See application file for complete search history.

(56) References Cited

U.S. PATENT DOCUMENTS

| | | | |
|---|---|---|---|
| 2003/0004998 A1* | 1/2003 | Datta | 707/513 |
| 2003/0009563 A1* | 1/2003 | Douglis et al. | 709/227 |
| 2004/0162886 A1* | 8/2004 | Ims et al. | 709/213 |

* cited by examiner

*Primary Examiner*—Mano Padmanabhan
*Assistant Examiner*—Duc T Doan
(74) *Attorney, Agent, or Firm*—Park, Vaughan & Fleming LLP

(57) ABSTRACT

A system and method for communicating a side effect of a data request, from a data server and through one or more caches, inline with a response to the request. Instead of sending a separate notification of the side effect (e.g., instructions to invalidate data cached in one or more caches), the notification is included in the response. As the response traverses caches on its way to the requestor, each cache applies the side effect with the proper timing. Thus, data invalidation may be performed prior to caching data included in the request and/or forwarding the response toward the requester. A final cache configured to serve the response to the requestor may remove the side effect notification before serving the response.

34 Claims, 3 Drawing Sheets

SYSTEM AND METHOD FOR INLINE INVALIDATION OF CACHED DATA

RELATED APPLICATIONS

This application claims priority to U.S. Provisional Application Ser. No. 60/500,726, filed on Sep. 5, 2003, which is hereby incorporated by reference. This application is related to U.S. application Ser. No. 10/727,308, filed Dec. 2, 2003 and entitled "System and Method for Invalidating Data in a Hierarchy of Caches."

BACKGROUND

This invention relates generally to the field of computer systems. More particularly, a system and method are provided for invalidating cached data as part of a response to a request for that data or related data.

In traditional caching schemes, a data server or other upstream computer system invalidates data cached in a downstream computer system with a distinct invalidation message targeting the cached data. The transmission of an invalidation message generally requires the creation of a communication connection separate from any other communications the data server may have with the cache(s) storing the targeted data. Creating a new connection may be relatively expensive, and is inefficient if it is to be used for only one communication (i.e., the invalidation message).

In many situations, a response to a data request, such as a request for a web page containing several objects or pieces of data, cannot be served until a previous version of the requested page, some or all of the content of the page, or data related to the requested data, are invalidated. Until acknowledgement of the invalidation is received at the server, the response must continue to wait. For example, when a client alters the appearance of a web page, a response to the alteration may include a redirection to the altered page. Traditionally, the redirection could cause the old version of the page to be served if the old version was not yet invalidated in all caches serving the client.

Additionally, issuance and acknowledgement of a traditional invalidation message must adhere to any security features that are in place. If, for example, a data server is behind a firewall or other protective construct, it may have to negotiate a connection with a downstream system each time it is to send an invalidation message to that system. Opening a connection downstream may be impossible because of the firewall. And, if not impossible, negotiating a new connection will at least delay the invalidation of the target data and the server's response to a data request that must wait for the target data to be invalidated. Further, managing invalidation accounts across multiple caches presents administrative as well as security challenges.

Yet further, when an upstream computer system is configured to invalidate data cached on one or more downstream systems, or caches, it may need to manage a number of invalidation accounts, passwords and/or other security or administrative information.

SUMMARY

In one embodiment of the invention, a system and methods are provided for communicating a side effect of a data request, from an origin server (e.g., a data server) to one or more caches, inline with a response to the request. One type of side effect is the invalidation of a previous version of the requested data, or data related to the requested data.

In this embodiment, instead of sending a separate notification of the side effect, the notification is included in the response. As the response traverses one or more caches on its way to the requestor, each cache applies the side effect with the proper timing. Thus, data invalidation may be performed prior to caching data included in the request and/or forwarding the response toward the requestor. A final cache configured to serve the response to the requestor may remove the side effect notification before serving the response.

DETAILED DESCRIPTION

Figure 1:
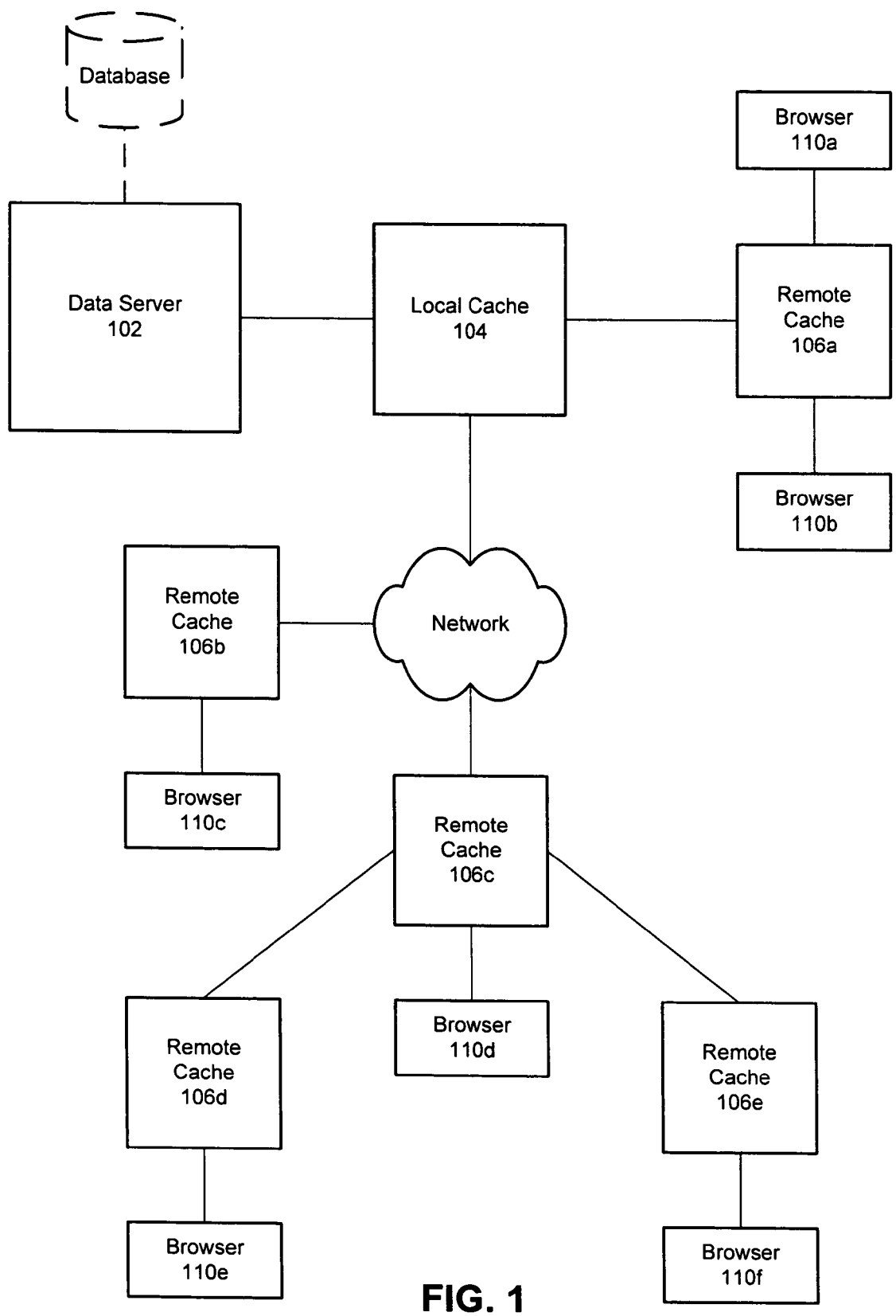
FIG. 1 depicts a computing environment in which data are cached, in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose or special-purpose computing device. Details of such devices (e.g., processor, memory, data storage, input/output, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory. Exemplary carrier waves may take the form of electrical, electromagnetic or optical signals conveying digital data streams along a local network, a publicly accessible network such as the Internet or some other communication link.

In one embodiment of the invention, a system and method are provided for communicating a side effect of a data request inline with (e.g., within) a response to the data request. In one implementation of this embodiment, a response to a data request is issued by a data server or origin server, and includes an instruction to a downstream cache to invalidate a data object that has been invalidated as a side effect to the data request or the processing of a response to the data request. Illustratively, this implementation may be employed by a web application developer to perform invalidation inline with a response to a data request, rather than performing the invalidation out-of-band.

In another embodiment of the invention, the invalidation of a cached data object (or other side effect) is communicated to a downstream cache, by an upstream cache, within a communication that may or may not be related to the data being invalidated. For example, the invalidation instructions may be included in a response to virtually any data request, as long as the response is directed toward the cache that is to apply the invalidation. This embodiment may also be applied to communicate a side effect other than data invalidation, particularly if the side effect can be executed asynchronously with respect to the data request or other event that spawned the side effect.

Other side effects that may be carried with or within a response include a forced garbage collection (e.g., when content being served is particularly large), propagation of cache server configuration data, propagation of password or other security information, and other operations upon downstream caches.

For example, in one alternative embodiment of the invention, a side effect may comprise an update to, or replacement for, a downstream cache program. In this alternative embodiment, the updated or new cache software might restart after the side effect is implemented.

FIG. 1 is a block diagram of a computing environment in which an embodiment of the invention may be implemented. Data server 102 manages or has access to data (e.g., a database) that may be requested by a user, client (e.g., a browser) or other server. Data server 102 may comprise a web server, an application server or some other origin server configured to respond to data requests.

Local, or central, cache 104 is local with regard to data server 102, and may be located in the same data center as the data server, or on the same local area network or network segment.

Remote caches 106 are logically remote to data server 102, relative to local cache 104, but may be physically located at any distance from the data server. A remote cache may be directly coupled to local cache 104 (e.g., remote cache 106a), may be coupled by a local area network, or may be coupled via a wide-area network such as the Internet (e.g., remote cache 106b). Local and remote caches may be chained or arranged in a hierarchical fashion (e.g., remote caches 106c, 106d, 106e).

Users or clients may be coupled to any remote caches and/or local cache 104. When a client submits a data request upstream (i.e., toward data server 102), any remote cache 106 or local cache 104 may serve the requested data if the data are cached. When a request results in cache misses at all caches between the requestor and data server 102, the request is forwarded to the data server. The requested data are assembled and passed downstream toward the requestor, and may be cached at any or all caches between the data server and the requester. Various other processing (e.g., application or business logic) may be applied during the handling of a data request or a response to a data request.

In one embodiment of the invention described herein, a side effect resulting from the processing of a data request (e.g., the invalidation of cached data) is communicated downstream as part of a response to the request. Each cache applies the side effect with the necessary timing and forwards the response downstream In another embodiment of the invention, an upstream cache (e.g., a computer system comprising a cache) piggybacks notification of a side effect of a data request or other event with virtually any response being communicated toward the same downstream entity (e.g., client, user). Thus, in this embodiment, the invalidation of a first set of data, a side effect of a first data request, may be piggybacked on a response to a second data request. The two requests may be from the same or different requestors and/or for the same, related or unrelated data. The piggybacked side effect may be unrelated to the response selected to convey the side effect. For example, a side effect such as an instruction to initiate an administrative action (e.g., system shutdown, data backup, log rotation) may be piggybacked with a response to a normal client data request.

Data server 102, local cache 104 and remote caches 106 may include any number or configuration of software modules or processes for receiving a data request, processing the request, identifying a side effect of the request or a response to the request, assembling a response to the request and serving the response toward the requestor.

A Method of Performing Inline Invalidation

In one embodiment of the invention, a method is provided for communicating a side effect of a data request (e.g., data invalidation) inline with a response to the request. As one skilled in the art will appreciate, this obviates the need for the data server to establish or employ a separate connection with one or more downstream caches to implement the side effect.

Traditionally, data invalidation is performed by the server before forwarding the response. The method described in this subsection thus avoids the round-trip communication time needed for the invalidation, and the time and processing needed to navigate any applicable security processes or devices (e.g., a firewall), to set up a secure session for example.

Further, a data server may not need to know or keep track of how or where to find local or remote caches, or how to separately instruct them to invalidate some cached data (e.g., an invalidation account, a password for accessing the account). Because the invalidation is performed inline with the response, the invalidation process receives the benefit of the process of responding to a data request.

ESI (Edge Side Includes), co-authored by Oracle Corporation, comprises one class of headers that may be configured to perform inline notification of a side effect of a data request. Other protocols or architectures, such as standard HTTP (Hypertext Transport Protocol), WML (Wireless Markup Language) and so on, may also be modified to perform inline notification.

In an implementation configured for use with ESI tags, a token such as the following ESI token may be included in a response header, to indicate that an ESI message is included in the response:

Surrogate-Control: content="ESI/1.0 ESI-INV/1.0"

In the body of the response, before or after the data to be served to the user, an invalidation message may be configured similarly to the following example:

<esi:invalidate>
<?xml version="1.0" ?>
<!DocType Invalidation System "internal:///WCSinvalidation.dtd">
<Invalidation Version="WCS-1.1">

-continued

```
<Object>
    <BasicSelector URI="/cgi/show_inventory.pl"/>
    <Action RemovalTTL="0"/>
</Object>
</Invalidation>
</esi:invalidate>
```

In this example, the URI identifies a CGI script or other executable file. The script may, for example, involve a database query to obtain the quantity of an item in inventory, the results of which may be cached and remain valid until the underlying data changes. When the inventory changes (e.g., because of a sale), the cached data must be invalidated.

In an illustrative application of an embodiment of the invention, a client may alter a web page, and a response to the alteration may include a redirection to the new version of the page. Instructions to invalidate the old, cached, version of the page (and cache the new version) are carried toward the client along with the redirection. Thus, the redirection can be guaranteed to redirect the client to the new version of the page. In particular, any cache along the response path can serve the new version of the page as soon as the response is processed by that cache.

Figure 2:
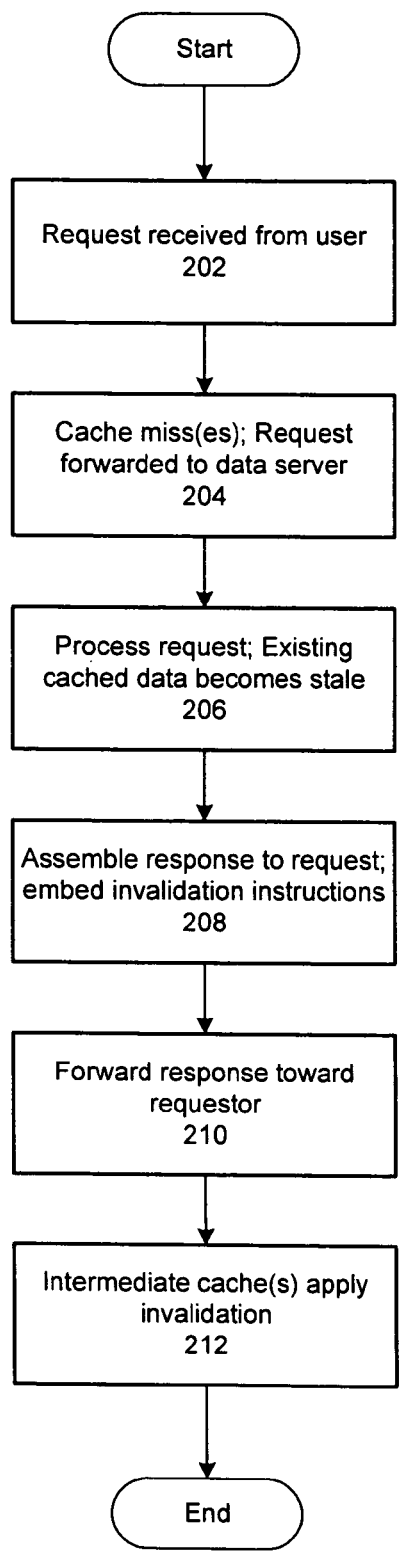
FIG. 2 is a flowchart demonstrating one method of performing inline notification of a side effect of responding to a data request, in accordance with an embodiment of the invention.

FIG. 2 demonstrates a method for performing inline notification of a side effect of responding to a data request, according to one embodiment of the invention. In this embodiment, a response to a user's data request is returned to the user only after the side effect is implemented.

In operation 202, a request for data is received at a cache (e.g., a remote web cache) from a user's client computing device. The client may be virtually any type of device configured to submit data requests, such as a desktop computer, a laptop, a web-enabled telephone, and may be portable or non-portable. The user's device may be coupled to a computing environment such as the environment of FIG. 1 by a wired or wireless connection, and may execute any type of software or user interface (e.g., a browser) for initiating data requests and receiving responses to such requests.

In particular, a data request may comprise a request for web content that includes perishable data (e.g., data that changes). Further, the request may comprise a user-generated request for specific data (e.g., a web page identified by URL or other address), or may comprise a refresh or update of data (e.g., a web page) viewed by the user. For example, if the user changes the arrangement or content of a viewed web page, a request may be spawned to refresh the page with updated content or download a related page.

In operation 204, the data request results in cache misses at one or more caches between the user and the data server (e.g., web server, application server, database) that manages the requested data. In other words, some or all of the data needed to satisfy the user's request is either not cached or is cached but invalid. Therefore, the request is forwarded to the data server for resolution.

In operation 206, the server processes the request, which may involve the execution of various tasks (e.g., submission of a query to a database, retrieval of stored data). As part of the processing of the request and generating a response, data cached on one or more caches between the user and the data server become invalid. The data that becomes stale may include data that were replaced or updated by data assembled by the server in response to the request. Or, the stale data may include data related to the request or the response (e.g., data that changed because of the nature of the user's request or the response to the request).

In operation 208, the server assembles a response to the request, which may include updated or new data requested by the user. In this embodiment of the invention, the request is formatted to include an instruction or instructions for invalidating the stale data. The stale data may include any number of data items or objects, which may be identified by name, address and/or other identifiers. In this embodiment, the invalidation of the stale data will be performed inline with the response to the data request, rather than being performed separately, or out-of-band, with the response.

In operation 210, the response, with the inline invalidation, is forwarded toward the user.

In operation 212, as each intermediate cache between the server and the user receives the response, it applies the inline invalidation to invalidate the specified data if they are stored on that cache. After applying the invalidation instructions, a cache may cache any or all of the data being served as part of the response. Then the response (with the inline invalidation instructions) is forwarded to the next downstream cache on a path to the user.

The last cache to process the request before serving the requested data to the user or the user's browser may remove the inline invalidation instructions. The illustrated method then ends.

One skilled in the art will appreciate that methods of performing inline notification of side effects, as described above, preserve the synchronous nature of responses to data requests. In other words, when a request is received at a data server, it is handled synchronously. The request will be processed until it is completed, and all tasks that must be performed before the requested data can be served (e.g., invalidation of stale data) are still performed before the requested data are served to the user.

In methods of performing inline notification of a side effect in other embodiments of the invention, a side effect may be implemented in a "lazy" manner. In other words, if a side effect of a user's data request need not be performed before a response to the request is served (e.g., data consistency is not of critical importance), the side effect may be performed asynchronously—before or after the response is served.

In one such alternative embodiment of the invention, execution or implementation of a side effect may be done after a response to a corresponding data request is served, but the implementation may be configurable to ensure that it occurs before a specified event. Specified events may include: another data request from the same user, another request for the same data but from a different user, another side effect, logging of the side effect, registration of a lock on a user, delivery of a response to a user, blocking of a request, dropping of a lock, execution of a data request, etc.

A Method of Piggybacking Invalidation

In one embodiment of the invention, a method is provided for piggybacking or merging the communication of a side effect of one data request (or other event) with a response to the same or a different data request or event. One type of side effect that may be communicated in this fashion is the invalidation of stale cached data.

This embodiment may be implemented in a computing environment comprising a hierarchy of caches—such as the multiple levels of caches depicted in FIG. 1. The caches may be configured to cache web pages, portions of web pages, data from a database, and/or other data objects.

Illustratively, an upstream cache (or a data server) is responsible for notifying one or more downstream caches when data are invalidated. In this embodiment, the upstream cache (or server) avoids the cost and time required to establish separate connections with the downstream caches for the sole purpose of passing invalidation messages. Also, the upstream cache may reduce its security or administrative burden because it will not need to identify or use a specialized invalidation account and password, or other security arrangement, to communicate the invalidations.

Because there is already a level of trust between the upstream cache and a downstream cache, which allows the upstream cache to easily send a response (e.g., an HTTP response) to a data request, no extra security measures need to be navigated when data invalidation instructions are added to a response.

As one skilled in the art will appreciate, an upstream cache, such as local cache 104 of FIG. 1, may maintain a subscription table or other collection of downstream caches that communicates with. Normally, data requests are received from those downstream caches and responses are sent to them. In this embodiment of the invention, the upstream cache may add instructions for invalidating data to a response sent to one of the downstream caches.

The downstream cache will then, in turn, forward the response and invalidation instructions to a subsequent downstream cache, and may add additional invalidation instructions if needed. The final cache, which serves the response to the requester, may remove all invalidation instructions.

A downstream cache may be added to an upstream cache's subscription table when the upstream cache receives a first data request from the downstream cache. The caches may be identified by a webcache identification (WID), network address, URI (Uniform Resource Identifier) or some other identifier.

Illustratively, each cache in a hierarchy of caches maintains a list, queue or other structure for storing invalidation instructions or messages that are to be communicated to its downstream caches. As it identifies to those caches the data needing to be invalidated, it adds appropriate instructions to responses directed to the downstream caches. When all caches in its subscription table have been sent instructions to invalidate a specified set of data, that set of data may be removed from the list or queue.

Messages or instructions for invalidating data may originate at a data server (e.g., a database, a web server, an application server) or may be manually originated by a system administrator or other entity.

A response configured to include an invalidation message may be identified as such (e.g., in its header, with a special response type). A downstream cache will then extract and apply the invalidation message before forwarding the response. Invalidation messages injected into responses may be numbered or otherwise identified. And, a downstream cache may acknowledge receipt of a piggyback invalidation message (e.g., in its next request or when the message is retrieved and applied).

In one implementation of this embodiment, when a downstream cache that, for a predetermined period of time, does not send a data request or other message to an upstream cache that requires a response (and which may be used to carry an invalidation message), the downstream cache may ping or send a special message to the upstream cache. The upstream cache can then use its response to the ping to carry an invalidation message.

Figure 3:
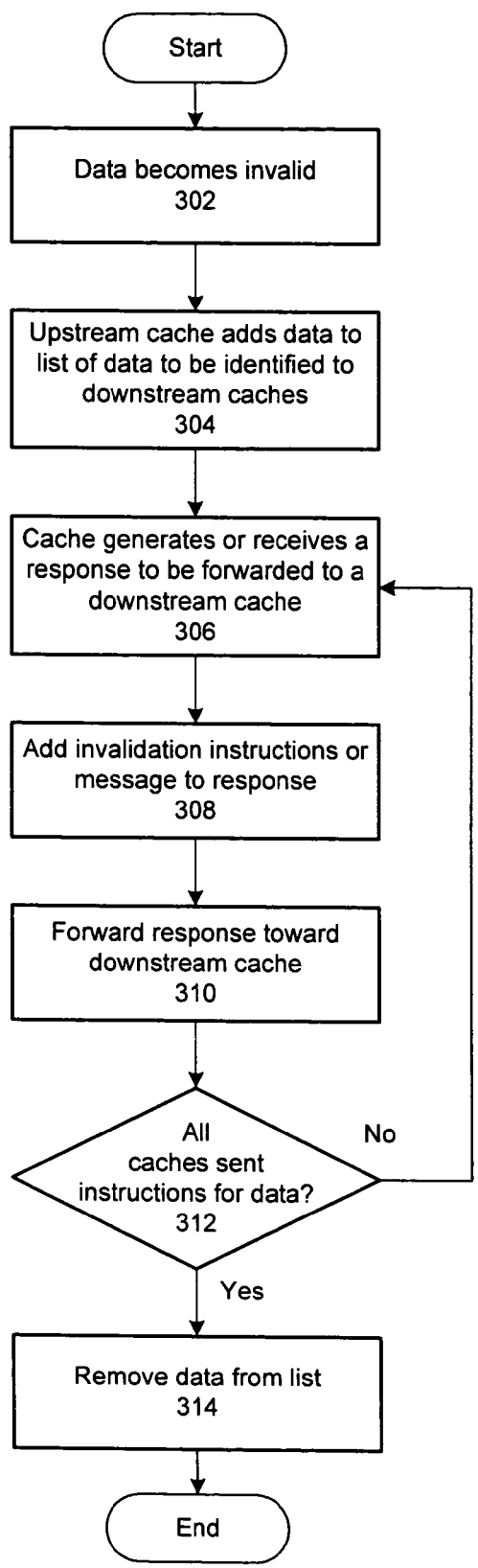
FIG. 3 is a flowchart illustrating one method of piggybacking an invalidation message on a response to a related or unrelated data request, in accordance with an embodiment of the invention.

FIG. 3 demonstrates a method of piggybacking a data invalidation message on a response to a data request, according to one embodiment of the invention. In other embodiments, other types of side effects may be communicated in this manner.

In operation 302, a set of data becomes invalid. This may occur during the processing of a data request, a response to a data request or some other event. The invalidation may occur automatically (e.g., according to an expiration time of the data), may be manually triggered by a system administrator, or may occur in some other way.

In operation 304, an upstream cache learns of the invalidation and adds the data to a list or collection of invalidated data that are to be identified to one or more downstream caches.

In operation 306, the upstream cache generates or receives (e.g., from an upstream cache or data server) a response to a data request or other event. The response is to be routed through one or more downstream caches that the upstream cache is responsible for identifying invalidated data to.

In operation 308, the upstream cache adds to the response an invalidation message or set of instructions for invalidating the data identified in operation 302. The invalidation message may be assigned a unique sequence number or other identifier. The sequence numbers may be monotonically increasing or decreasing, which will allow a downstream cache to readily determine whether it has missed an invalidation message. Any amount of data, or number of data items, may be identified in one invalidation message.

In operation 310, the response is forwarded to a downstream cache. In this embodiment, the upstream cache records the fact that the invalidation message was sent to the downstream cache so that the upstream cache can determine when it has sent the message to all downstream caches for which it is responsible.

In operation 312, the upstream cache determines whether all of its downstream caches have been sent (and, perhaps, acknowledged) the invalidation message. Illustratively, the invalidation message may be carried in different data request responses (or other communications) to each downstream cache.

If not all downstream caches have been sent the message, the illustrated method returns to operation 306 to forward the message to another downstream cache when a response or other communication directed to the downstream cache is identified.

In operation 314, the set of data is removed from the upstream cache, because all downstream caches for which it is responsible have been notified of the invalidation. The method then ends.

In a cache cluster, any cache that receives an invalidation message may automatically notify other cluster members. Further, if an upstream cache attempts to forward an invalidation message (in a response or other communication) but fails for a predetermined number of times, it may drop the downstream cache from its subscription table. The downstream cache will be required to subscribe again, by giving the upstream cache sufficient information to allow it to communicate with the downstream cache.

As described with regard to inline propagation of a side effect in the previous section, in other methods of piggybacking notification of a side effect, a side effect may be performed in a "lazy" manner. If a side effect of a data request need not be performed before a response to the request is served, the side effect may be performed asynchronously—before or after the response is served.

In one such alternative embodiment of the invention, a side effect may be executed after a response to a corresponding data request is served, but the execution may be configurable to ensure that it is done before some other specified event. Such events include: another data request from the same user, another request for the same data from a different user, another side effect, logging of the side effect, registration of a lock on a user, delivery of a response to a user, blocking of a request, dropping of a lock, execution of a data request, etc.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. An automated method of performing inline invalidation of cached data, the method comprising:
   receiving at a data server a data request initiated by a requestor;
   identifying cached data to be invalidated before the requested data can be served to the requestor;
   generating a response to the data request, wherein the response includes a message attached to the response containing instructions to invalidate said cached data;
   transmitting the response toward the requestor; and
   at one or more caches:
      executing said instructions; and
      forwarding the response toward the requestor.

2. The method of claim 1, wherein said forwarding is performed only after said executing.

3. The method of claim 1, wherein the cached data to be invalidated include data modified in the request.

4. The method of claim 1, wherein the cached data to be invalidated include stale versions of data requested in the data request.

5. The method of claim 1, further comprising:
   at a final cache, removing said instructions before serving the response to the requestor.

6. The method of claim 1, wherein said generating comprises inserting in the response an ESI (Edge Side Includes) token configured to identify said cached data.

7. The method of claim 1, wherein no invalidation message configured to invalidate the cached data, other than the response, is forwarded from the data server.

8. The method of claim 1, wherein said receiving comprises:
   receiving the data request at a first cache, wherein the data request results in a cache miss at the first cache; and
   forwarding the data request through one or more additional caches toward the data server, wherein the data request results in cache misses at each of the one or more additional caches.

9. The method of claim 8, wherein said transmitting comprises:
   forwarding the response through the one or more additional caches toward the requestor.

10. The method of claim 9, wherein said executing comprises:
    at each of the one or more additional caches:
       invalidating said cached data; and
       selectively caching data included in the response.

11. A computer readable medium storing instructions that, when executed by a computer, cause the computer to perform a method of performing inline invalidation of cached data, the method comprising:
    receiving at a data server a data request initiated by a requestor;
    identifying cached data to be invalidated before the requested data can be served to the requestor;
    generating a response to the data request, wherein the response includes a message attached to the response containing instructions to invalidate said cached data;
    transmitting the response toward the requestor; and
    at each of one or more caches:
       executing said instructions; and
       forwarding the response toward the requestor.

12. A computer-implemented method of communicating a side effect of processing a data request to one or more caches, the method comprising:
    at a data server, receiving a data request from a requestor through a set of caches;
    identifying a side effect to be implemented on one or more of the caches;
    generating a response to the data request, wherein the response includes a message attached to the response containing instructions to implement said side effect;
    identifying the side effect in the response;
    serving the response toward the requestor through the set of caches; and
    at each of the one or more caches:
       implementing the side effect; and
       forwarding the response toward the requestor.

13. The method of claim 12, further comprising:
    at a final cache coupled to the requestor, modifying the response to remove identification of the side effect before serving the response to the requestor.

14. The method of claim 12, wherein said implementing the side effect comprises implementing the side effect prior to caching data included in the response.

15. The method of claim 12, wherein said implementing the side effect comprises implementing the side effect after said forwarding.

16. The method of claim 15, wherein said implementing the side effect comprises implementing the side effect before a specified event.

17. The method of claim 12, wherein said identifying the side effect comprises inserting in the response an ESI (Edge Side Include) token configured to identify the side effect.

18. The method of claim 12, wherein the side effect comprises invalidation of one or more data objects cached in a subset of the set of caches.

19. The method of claim 12, wherein the side effect comprises propagation of cache configuration data.

20. The method of claim 12, wherein the side effect comprises a password.

21. The method of claim 12, wherein the side effect comprises an update to a cache program.

22. The method of claim 12, wherein the side effect comprises a replacement cache program.

23. A computer readable medium storing instructions that, when executed by a computer, cause the computer to perform a method of communicating a side effect of processing a data request, the method comprising:
    at a data server, receiving a data request from a requestor through a set of caches;
    during processing of the data request at the data server, identifying a side effect to be implemented on one or more of the caches;
    generating a response to the data request, wherein the response includes a message attached to the response containing instructions to implement said side effect;
    identifying the side effect in the response;
    serving the response toward the requestor through the set of caches; and at each of the one or more caches:
  implementing the side effect; and
  forwarding the response toward the requestor.

24. An apparatus for communicating a side effect of a data request from a server, the apparatus comprising:
  a receiving module configured to receive, via one or more caches, a data request initiated by a requestor;
  a processing module configured to process the data request and identify a side effect of processing the data request;
  an assembly module configured to assemble a response to the data request, wherein the response includes a message attached to the response containing instructions to implement said side effect, and wherein the response includes a message attached to the response containing instructions to invalidate said cached data wherein the response is configured to convey notification of the side effect to the one or more caches; and
  a server configured to serve the response toward the requestor;
  wherein, at each of the one or more caches, the side effect is implemented and the response is forwarded toward the requestor.

25. The apparatus of claim 24, wherein the side effect comprises the invalidation of data cached on a subset of the one or more caches.

26. The apparatus of claim 24, wherein the side effect comprises propagation of cache configuration data.

27. The apparatus of claim 24, wherein the side effect comprises a password.

28. The apparatus of claim 24, wherein the side effect comprises an update to a cache program.

29. The apparatus of claim 24, wherein the side effect comprises a replacement cache program.

30. The apparatus of claim 24, wherein implementing the side effect at a cache comprises implementing the side effect after forwarding the response toward the requestor.

31. The apparatus of claim 30, wherein implementing the side effect at a cache comprises implementing the side effect before a specified event.

32. A network configured to apply inline invalidation of cached data, comprising:
  a data server configured to:
    respond to data requests; and
    in a first response to a first data request and not in any communication other than the first response, identify cached data to be invalidated; and
  one or more caches configured to cache data for satisfying the data requests, including a first cache;
  wherein the first cache is configured to:
    receive the first response, wherein the first response includes a message attached to the response containing instructions to invalidate said cached data;
    invalidate the identified cached data; and
    forward the first response.

33. The network of claim 32, wherein the first cache is configured to forward the first response only after invalidating the identified cached data.

34. The network of claim 32, wherein the first cache is configured to forward the first response before invalidating the identified cached data.

* * * * *